March 26, 1946.  C. M. EGAN ET AL  2,397,252
ELECTRIC ARC WELDING HANDLE
Filed June 23, 1943
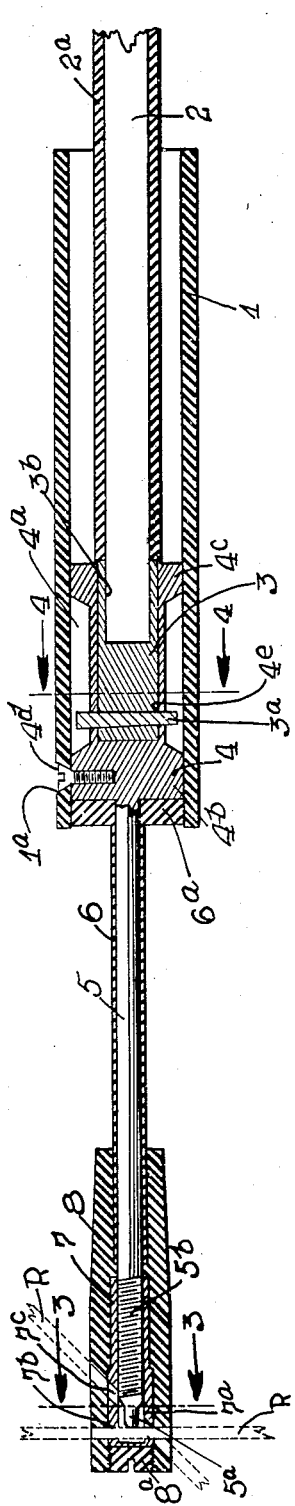
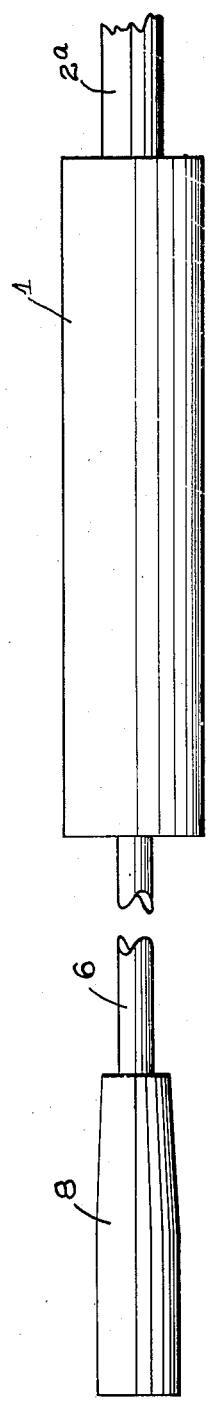
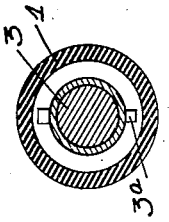
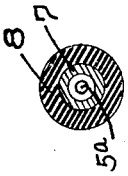
INVENTOR.
Charles M. Egan
Carl H. Ledford
BY A.B. Bowman
Attorney Patented Mar. 26, 1946

2,397,252

UNITED STATES PATENT OFFICE 2,397,252

ELECTRIC ARC WELDING HANDLE

Charles M. Egan, La Mesa, and Carl H. Ledford, National City, Calif.

Application June 23, 1943, Serial No. 491,872

1 Claim. (Cl. 219—8)

Our invention relates to an electric arc welding handle and the objects of our invention are:

First, to provide an electric arc welding handle which is very light and well balanced;

Second, to provide a handle of this class which has a relatively small head which will give a maximum visibility to the operator when working in close places;

Third, to provide a handle of this class which is fully insulated and will therefore prevent arcing at all times;

Fourth, to provide a handle of this class which is sufficiently long to permit the operator to reach difficult welding problems and also improves the balance of the handle;

Fifth, to provide a handle of this class which provides for various angles of the welding rod;

Sixth, to provide a handle of this class which is very simple and economical of construction, easy to operate, efficient in its action and which will not readily deteriorate or get out of order.

With these and other objects in view as will appear hereinafter, our invention consists of certain novel features of construction, combination and arrangement of parts and portions as will be hereinafter described in detail and particularly set forth in the appended claim, reference being had to the accompanying drawing and to the characters of reference thereon which form a part of this application in which:

Figure 1 is a longitudinal sectional view of our electric arc welding handle showing some of the parts and portions in elevation to facilitate the illustration; Fig. 2 is a fragmentary side elevational view thereof; Fig. 3 is a transverse sectional view taken from the line 3—3 of Fig. 1; and Fig. 4 a transverse sectional view taken from the line 4—4 of Fig. 1.

Similar characters of reference refer to similar parts and portions throughout the several views of the drawing:

The main handle member 1, electrical conductor 2, electrical conductor connector 3, electrical conductor connector support 4, extension member 5, extension member insulation 6, welding rod holder 7, and welding rod holder insulation 8 constitute the principal parts and portions of my electric arc welding handle.

The handle member 1 is a hollow cylindrical or tubular member made of insulation material preferably about one and one-eighth inches in diameter and fitted therein so as to shift longitudinally is electrical connector support 4 which is provided with an annular recess 4a leaving two flanges 4b and 4c.

Mounted in the flange portion 4b is a screw 4d which is preferably provided with a countersunk head which is fitted into a countersunk recess 1a, it being noted that the screwhead of the screw 4d is sunk slightly below the outer surface of the member 1. The member 4 is provided with a bore 4e extending inwardly from the flange end 4c in which is fitted electrical conductor connector 3 and secured tightly therein by means of a tapered pin 3a fitted in a tapered hole in both the members 3 and 4, as shown best in Fig. 1 of the drawing to provide a tight tapered fit of the pin for holding the member 3 securely in the member 4. The member 3 is provided in the end opposite from the pin 3a with a bore 3b which extends inwardly some distance therefrom, as shown best in Fig. 1 of the drawing and in which is secured the one end of the electric conductor 2 preferably by soldering. This conductor 2 is provided with the conventional insulation 2a and extends outwardly through the open end of the handle member 1. Secured centrally to the end of the flange portion 4b is the extension member 5, which is substantially one-quarter of an inch in diameter and is provided on its extended end with a reduced rounded end 5a and backwardly from said reduced rounded end is a threaded portion 5b. Positioned around the member 5 is the extension member 6 which is composed of insulation material and fits snugly the member 5 and is provided on one extending end with an annular relatively thick flange portion 6a fitted snugly into the end of the member 1 and abutted against the end of the flange portion 4b as shown best in Fig. 1 of the drawing. Screw-threaded on the end of the member 5 on the threads 5b is the welding rod holder 7 which is a metallic member. This member 7 is provided with a relatively large closed head end 7a provided with a transverse hole 7b and with an angularly disposed hole 7c extending through the opposite side of said member 7, as shown best in Fig. 1 of the drawing, adapted to receive the welding rod R, shown by dash lines in either transverse position or angular position and when the member 7 is screwed tightly on the member 5, the end 5a of the member 5 engages the rod and holds it tightly in position whether transversely or angular position.

Secured over the member 7 and extending over the end of the insulation member 6 some distance is an insulation member 8 which is provided with holes conforming to and extending from the holes 7b and 7c of the member 7. The insulation member 8 is provided with an open threaded end in which is mounted an insulation plug 8a, thus providing a complete insulation and support for the members 7, 5 and 6, as well as the welding rod.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claim.

Having thus described our invention, what we claim as new and desire to secure by Letters Patent is:

In an electric arc welding handle of the class described, the combination of a hollow insulation tubular handle member, an electrical conductor connector support fitting the interior of said handle member and shiftable longitudinally therein and provided with a relatively small extension member extending outwardly of said tubular handle member at one end, an insulation member surrounding said extension member provided with an annular flange tightly fitting the end of said hollow insulation tubular handle member and resting against said electrical conductor connector support, a welding rod holder adjustably mounted on said extension member, and an insulation member covering said welding rod holder and overlapping said insulation member surrounding said extension member.

CHARLES M. EGAN.
CARL H. LEDFORD.